US012744422B2

(12) United States Patent
Nies et al.

(10) Patent No.: US 12,744,422 B2
(45) Date of Patent: Sep. 22, 2026

(54) COOLING OF COILS OF ELECTRICAL MACHINES

(71) Applicant: General Electric Renovables Espana, S.L., Barcelona (ES)

(72) Inventors: Jaco Nies, Kampen (NL); Samir A Salamah, Schenectady, NY (US)

(73) Assignee: GE Vernova Renovables Espana, S.L., Barcelona (ES)

( * ) Notice: Subject to any disclaimer, the term of this patent is extended or adjusted under 35 U.S.C. 154(b) by 100 days.

(21) Appl. No.: 18/626,562

(22) Filed: Apr. 4, 2024

(65) Prior Publication Data

US 2025/0317019 A1 Oct. 9, 2025

(51) Int. Cl.

*H02K 3/12* (2006.01)
*H02K 1/16* (2006.01)
*H02K 5/20* (2006.01)
*H02K 7/18* (2006.01)
*H02K 15/10* (2006.01)

(52) U.S. Cl.

CPC ................ *H02K 3/12* (2013.01); *H02K 1/16* (2013.01); *H02K 5/20* (2013.01); *H02K 7/183* (2013.01); *H02K 15/105* (2013.01)

(58) Field of Classification Search

CPC .. H02K 3/24; H02K 3/18; H02K 3/38; H02K 3/34; H02K 3/00; H02K 3/04; H02K 3/12; H02K 3/48; H02K 3/28; H02K 1/16; H02K 7/183; H02K 7/1838; H02K 15/10; H02K 15/105; H02K 15/0431; Y10T 29/49009

USPC ........................ 310/203, 208, 206, 207, 198

See application file for complete search history.

(56) References Cited

U.S. PATENT DOCUMENTS 3,324,322 A * 6/1967 Johns ....................... H02K 3/28 310/198
5,898,251 A * 4/1999 Mochizuki ............... H02K 3/28 310/179
6,809,441 B2 10/2004 Randall (Continued)

FOREIGN PATENT DOCUMENTS

CN 101785167 B * 12/2012 ............... H02K 3/28
DE 19 67 784 U 9/1967

(Continued)

OTHER PUBLICATIONS

Epoflex, Flexible Tapes 324.03, Von Roll Holding Ltd, Switzerland, 1 page. Retrieved Apr. 2, 2024 from webpage https://sibel.bg/upl_doc/Epoflex_324.03_EN.pdf.

(Continued)

*Primary Examiner* — Maged M Almawri
(74) *Attorney, Agent, or Firm* — Dority & Manning, P.A.

(57) ABSTRACT

The present disclosure relates to coils (121), electrical machines (100) comprising coils (121), e.g. a wind turbine generator (42), and methods for cooling coils (121) of electrical machines (100) and for winding and/or electrically insulating (200) coils (121). An electrical machine (100) comprises a rotor (110) and a stator (120). At least one of the rotor (110) and the stator (120) comprises a plurality of teeth (119) and a plurality of coils (121), the coils (121) comprising strand (150) which is wound around the teeth (119) in layers (130, 131). A first axial end portion of a first layer (130) of at least one of the coils (121) is axially displaced (117) with respect to a first axial end portion of a second layer (131) of the coil (121).

18 Claims, 5 Drawing Sheets

(56) References Cited

U.S. PATENT DOCUMENTS 8,836,195 B2 * 9/2014 Yokochi .................. H02K 3/28 310/179
9,837,869 B2 * 12/2017 Hashimoto ............ H02K 3/522
10,305,339 B2 * 5/2019 Awazu ..................... H02K 3/12
10,461,591 B2 * 10/2019 Sakaue ................ H02K 15/085
11,075,556 B2 * 7/2021 Takeuchi ................. H02K 3/28
12,537,410 B2 * 1/2026 Lines ....................... H02K 3/47
12,562,628 B2 * 2/2026 Witt ......................... H02K 3/14
12,573,902 B2 * 3/2026 Kuroda .................... H02K 3/12
2002/0047449 A1 * 4/2002 Kim ......................... H02K 3/28 310/184
2006/0152188 A1 * 7/2006 Yasuhara ................. H02K 3/28 318/727
2007/0278889 A1 * 12/2007 Sasaki ...................... H02K 3/28 310/156.28
2008/0174196 A1 * 7/2008 Hattori ..................... H02K 3/28 310/180
2009/0001843 A1 * 1/2009 Enomoto ............... H02K 1/145 310/257
2010/0066196 A1 * 3/2010 Stiesdal ................... H02K 3/12 310/198
2010/0141078 A1 * 6/2010 Kouda ..................... H02K 3/12 310/195
2010/0283349 A1 * 11/2010 Wolf .................. H02K 15/0485 310/195
2010/0289374 A1 * 11/2010 Koga ................... H02K 15/064 310/195
2013/0076170 A1 3/2013 Adra et al.
2013/0127290 A1 * 5/2013 Matsubara ............... H02K 3/38 310/208
2015/0061450 A1 * 3/2015 Nakagawa ............... H02K 3/28 310/198
2019/0280546 A1 * 9/2019 Soerensen ................. F03D 9/25
2020/0136441 A1 * 4/2020 Azar ...................... H02K 1/265
2021/0184516 A1 * 6/2021 Marvin .................. H02K 9/227
2022/0021276 A1 * 1/2022 Ramtahal ............... H02K 11/25
2022/0360123 A1 * 11/2022 Azar ...................... H02K 7/183
2023/0080266 A1 * 3/2023 Pradeepkumar ......... H02K 3/12 310/68 C
2023/0099218 A1 * 3/2023 Yamaguchi ............. H01F 41/12 336/205
2023/0105198 A1 * 4/2023 Toi .......................... H02K 3/12 310/179

FOREIGN PATENT DOCUMENTS

EP 1376818 A2 * 1/2004 ............... H02K 3/12
EP 1257043 B9 2/2016
EP 3 054 569 A1 8/2016
EP 3 534 499 A1 9/2019
EP 3 826 146 A1 5/2021
EP 3 940 930 A1 1/2022
JP 2009291050 A * 12/2009
JP 2009303335 A * 12/2009
JP 4 583798 B2 11/2010
JP 2015035901 A * 2/2015 ............. H02K 15/24
JP 6 333044 B2 5/2018
JP 6 817487 B1 1/2021
WO WO2013/048600 A1 4/2013

OTHER PUBLICATIONS

EPO Search Report, Jul. 30, 2025.

* cited by examiner

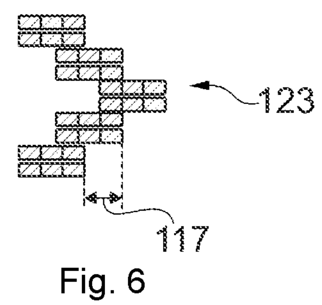
Fig. 6
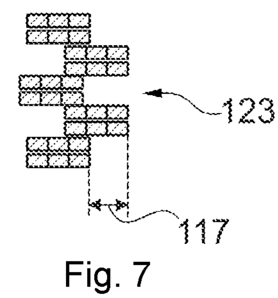
Fig. 7
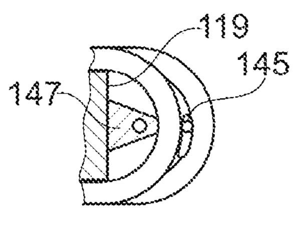
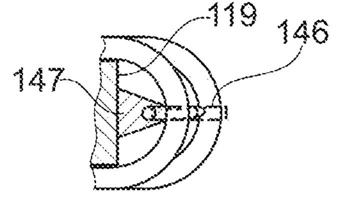
Fig. 8A
Fig. 8B
Fig. 8C
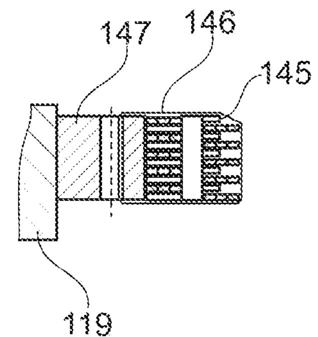
Fig. 9
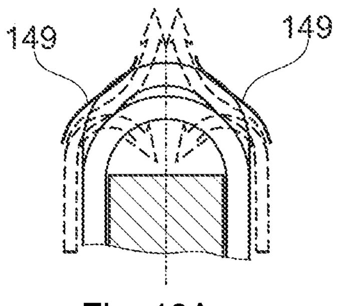
Fig. 10A
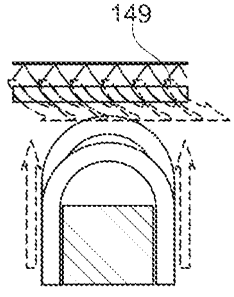
Fig. 10B

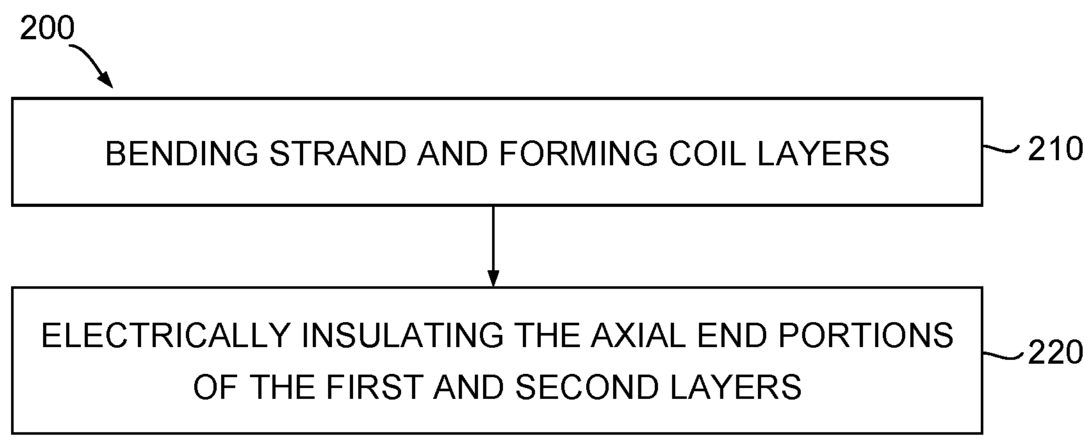
Fig. 11
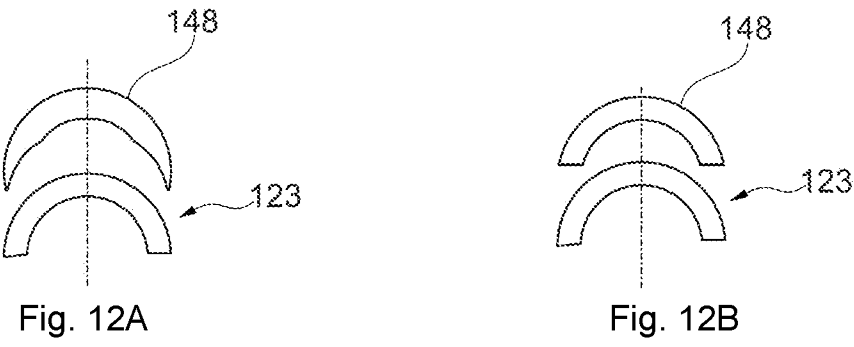
Fig. 12A
Fig. 12B
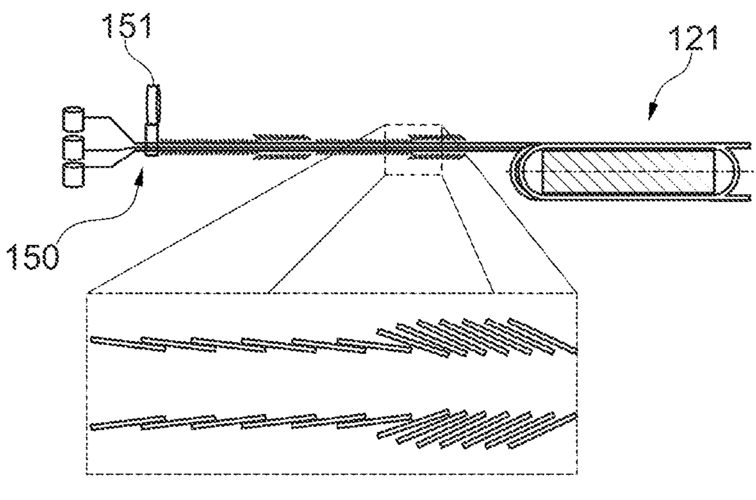
Fig. 13

COOLING OF COILS OF ELECTRICAL MACHINES

TECHNICAL FIELD

The present disclosure relates to electrical machines comprising coils and methods for cooling coils of electrical machines. More in particular, the present disclosure relates to electric generators including coils and methods for cooling the coils of a generator of a wind turbine, e.g. the coils of a stator of a direct drive wind turbine. The present disclosure further relates to coils and methods for winding and/or electrically insulating the coils.

BACKGROUND

Electrical machines, such as motors and generators, generally comprise a rotor structure and a stator structure. Large electric generators may be e.g. electrically excited generators or permanent magnet excited generators (PMG). The rotor of an electrical machine rotates with respect to the stator. The rotor may be the inner structure and the stator the outer structure. The stator in this case thus surrounds, e.g. radially, the rotor. Alternatively, the configuration may be the opposite, i.e. the rotor surrounds, e.g. radially, the stator.

Such generators may be used for example in wind turbines. Wind turbines generally comprise a rotor with a rotor hub and a plurality of blades. The rotor is set into rotation under the influence of the wind on the blades. The rotation of the rotor shaft either drives the generator rotor directly ("directly driven") or through the use of a gearbox.

A direct drive wind turbine generator may have a diameter of e.g. 6-10 meters (236-394 inches), a length of e.g. 2-3 meters (79-118 inches) and may rotate at low speed, for example in the range of 2 to 20 rpm (revolutions per minute). Alternatively, generators may also be coupled to a gearbox which increases the rotational speed of the generator to for example between 50 to 500 rpm or even more.

In electrical machines, such as generators of direct drive wind turbines, cooling is generally important. In particular, the electromagnetic or "active" elements of the generator may heat up, e.g. permanent magnets or coils on the rotor and coils of the stator. An increase in temperature of the coils may lead to failure of the coils and may reduce the efficiency of the generator. Coil temperature can constitute an effective limitation on the nominal power of a generator, i.e. in practice the amount of power generated by a generator may be limited by a maximum allowable temperature threshold.

To reduce the temperature of the active elements, a cooling fluid such as air may be run through the air gap separating the coils and the active elements of the rotor. The cooling fluid contacts the active element and takes heat away from them. A cooling system may be provided for guiding the cooling fluid towards and away from the air gap, and thus removing heat from the active elements of the generator. In practice, generally the heating of coils is more critical than the heating of permanent magnets.

During operation of the wind turbine, heating of the active elements is not necessarily homogeneous. For example, the coils may heat up more at axial end portions of the coils, specifically axial end portions far from the cooling fluid inlets and close to the cooling fluid outlets. It is known to provide air to the air gap along an axial direction of the generator through a plurality of inlets and remove it from the generator through a plurality of outlets. In such a case, the axial end portions of the coils close to the inlets will cool more than the axial end portions of the coils close to the outlets, because the cooling air heats up as it axially passes through the air gap.

Besides the elevated temperature of the cooling air when reaching the axial end portions of the coils close to the outlets, the cooling air may not follow the curvature of the coils at these axial ends. I.e., the contact, and thus also the heat exchange, between the cooling air and the end portions of these coils may not be very good. Also, one or more coil supporting elements such as teeth and optionally other additional elements around which the coils are arranged, do not help in general to cool the coils.

The present disclosure aims to improve the cooling of the coils of electrical machines.

SUMMARY

In an aspect of the present disclosure, an electrical machine is provided. The electrical machine comprises a rotor and a stator. At least one of the rotor and the stator comprises a plurality of teeth and a plurality of coils, the coils comprising one or more strands wound around the teeth in layers. The coils comprise a first axial end portion, a central portion and a second axial end portion opposite to the first axial end portion. The layers of the coils comprise a first axial end portion, a central portion and a second axial end portion opposite to the first axial end portion. A first axial end portion of a first layer of at least one of the coils is axially displaced with respect to a first axial end portion of a second layer of the coil.

According to this aspect, the end portions of two layers at a first axial end portion of a coil are axially displaced. I.e., one end portion of the layer protrudes more than the end portion of the other layer in an axial direction.

Thereby, the surface of the first axial end portion of the coil exposed to the cooling fluid increases. Also, an irregular first axial end portion may help to create turbulence in the cooling fluid. The first axial end portion of the coil may be cooled more effectively.

Throughout this disclosure, a coil may be formed by a stack of layers or turns of an electrical conductor, e.g. one or more copper strands, around a core. Each of the layers may be electrically insulated from the other layers and may be formed by two substantially straight parallel segments (central portion of the layer), and two curved segments (axial end portions of the layer). Each of the layers continues into the layer directly on top of it or directly underneath it. The electrical insulation between the layers may be provided by e.g. insulating tape.

An electrical machine may be a generator, in particular a generator for a wind turbine, and more in particular a generator for a direct drive wind turbine.

In another aspect, a method for insulating a coil is provided. The method comprises bending electrically conductive strand and forming layers of a coil such that a first axial end portion of a first layer of the coil is displaced along a longitudinal direction of the coil with respect to a first axial end portion of a second layer of the coil. The method further comprises electrically insulating the first axial end portions of the first layer and the second layer.

According to a further aspect, a generator for a wind turbine is provided. The generator comprises a rotor, a stator and a radial air gap separating the rotor and the stator. The stator comprises a plurality of teeth and a plurality of coils wound around the teeth in layers. A coil comprises a first layer having an axial end portion axially displaced with respect to an axial end portion of a second layer adjacent the first layer. The axial end portions of the first layer and the second layer are at a same axial region of the coil.

BRIEF DESCRIPTION OF THE DRAWINGS

FIG. 6 schematically illustrates an enlarged view of another example of a central cross-section of the coils taken along line A-A of FIG. 4A.

FIG. 7 schematically illustrates an enlarged view of another example of a central longitudinal cross-section of a coil. The cross-section includes the longitudinal direction of the coil and a direction parallel to a height of the coil;

FIGS. 8A-8C schematically illustrate an enlarged top view of an example of coil where a supporting insert is being arranged in an end portion of the coil;

FIG. 9 schematically illustrates a central longitudinal cross-section of FIG. 8C;

FIGS. 10A and 10B schematically illustrate an enlarged top of two examples of a coil and scoops for directing the flow of the cooling fluid;

FIG. 11 schematically illustrates a flowchart of an example of a method for insulating a coil;

FIGS. 12A and 12B schematically illustrate two examples of pre-shaped elements for electrically insulating an axial end portion of a layer of a coil; and FIG. 13 schematically illustrates an example of electrically insulating strand before it is bent for forming a coil. Specifically, the strand portions which will be axial end portions are provided with a thicker insulation.

DETAILED DESCRIPTION OF EXAMPLES

Figure 1:
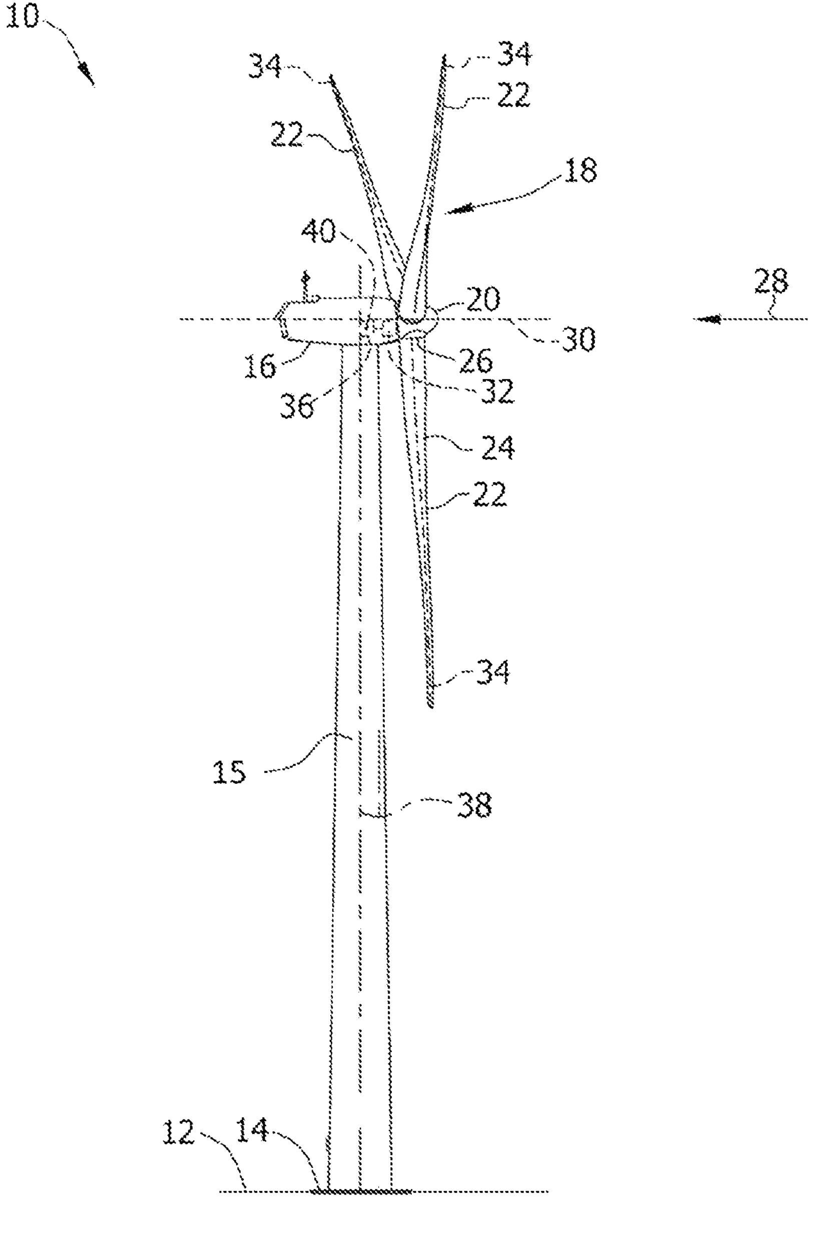
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Although a generator for a direct drive wind turbine is mainly referred to herein, the invention can be applied in general to electrical machines.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower. A wind turbine 10 may be placed both onshore and offshore.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
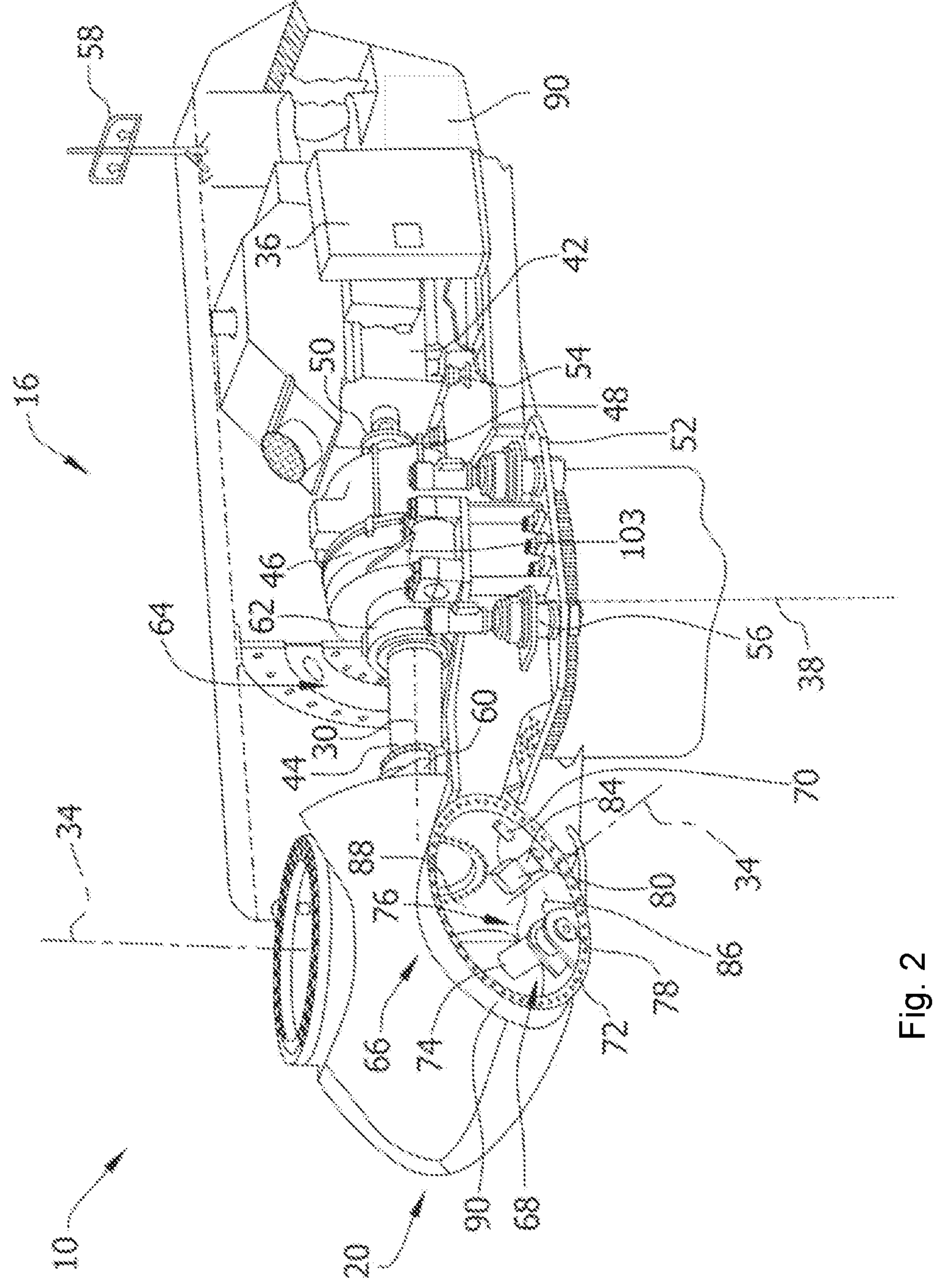
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between e.g. 400V to 1000 V into electrical energy having medium voltage (10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator

84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
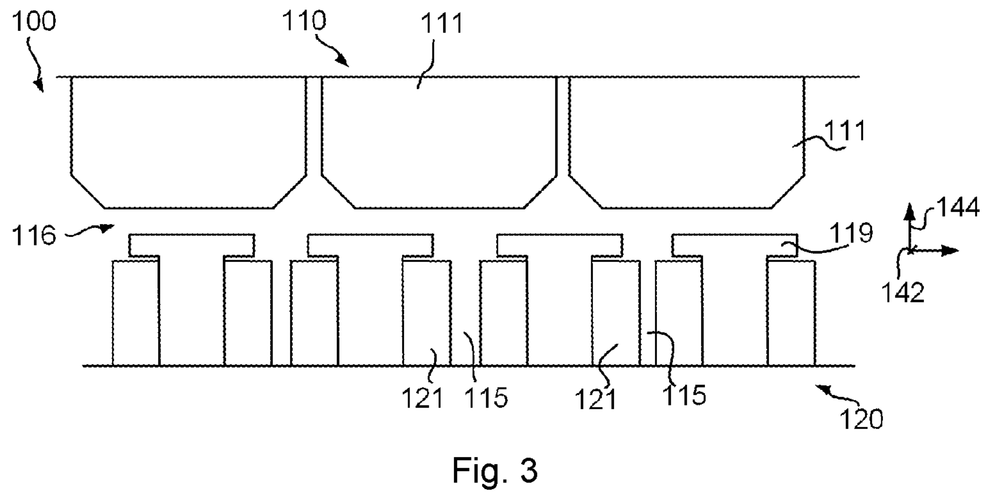
FIG. 3 schematically illustrates an enlarged view of a cross-section of an example of an electrical machine.

In an aspect of the disclosure, an electrical machine is provided. An enlarged view of a cross-section of an example of an electrical machine 100 is schematically illustrated in FIG. 3. The cross-section of FIG. 3 is in a plane perpendicular to an axial 142 direction of the rotor, the stator and therefore of the electrical machine. Even though rotor and stator are shown to extend linearly, i.e. horizontally, in reality, both the rotor and stator may be curved in the case of a radial air gap between the active examples.

Figure 4A:
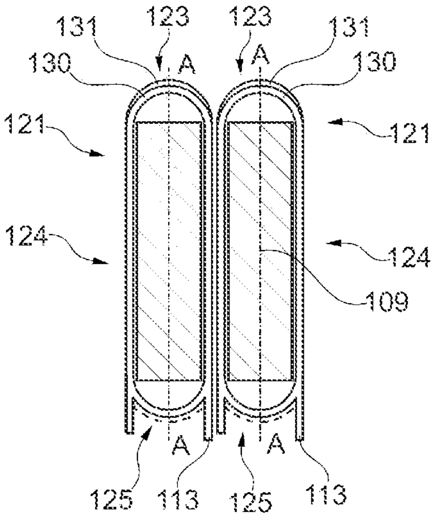
FIGS. 4A and 4B schematically illustrate an enlarged top view of two examples of a stator as seen from the air gap.
Figure 4B:
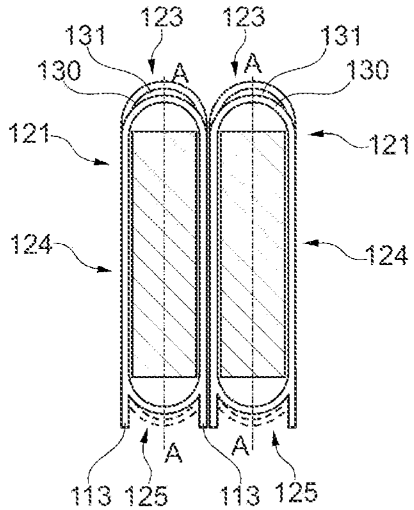
Figure 5A:
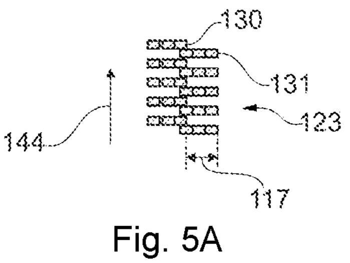
FIGS. 5A and 5B schematically illustrate an enlarged view of an example of a central cross-section of the coils taken along line A-A of FIGS. 4A and 4B, respectively.
Figure 5B:
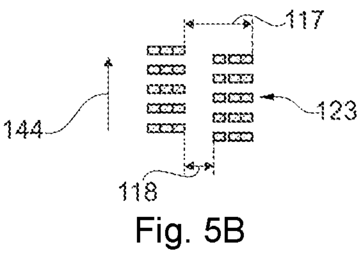

An enlarged top view of two examples of a stator as seen from the air gap between the rotor and the stator is schematically illustrated in FIGS. 4A and 4B. An enlarged view of an example of a central longitudinal cross-section of the coils taken along line A-A of FIGS. 4A and 4B is schematically illustrated in FIGS. 5A and 5B, respectively.

The electrical machine 100 comprises a rotor 110 and a stator 120, see FIG. 3. At least one of the rotor 110 and the stator 120 comprises a plurality of teeth 119 and a plurality of coils 121. The coils 121 comprise strand which is wound around the teeth 119 in layers 130, 131. The coils 121 comprise a first axial end portion 123, a central portion 124 and a second axial end portion 125 opposite the first axial end portion 123, see FIGS. 4A and 4B. The axial end portions may herein be considered to include the curved bends of each of the layers of strands. The central portions may herein be considered to include the straight portions of the layers of strands.

Likewise, the layers of the coils comprise a first axial end portion, a central portion and a second axial end portion opposite the first axial end portion. A first axial end portion of a first layer 130 of at least one of the coils 121 is axially displaced 117 with respect to a first axial end portion of a second layer 131 of the coil 121.

Therefore, at least one axial end portion of a layer of a coil 121 is axially displaced with respect to another end portion of a layer of the coil 121 in the same axial end of the coil. For example, in the first axial end portion 123 of a coil 121, the end portion of one layer 130 may be displaced in an axial direction 142 with respect to the end portion of an adjacent layer 131. Therefore, the surface area of the layers 130, 131 at an axial end portion 123, 125 of a coil 121 that is exposed to the cooling fluid (e.g. cooling air in the air gap) increases. The cooling of the axial end of the coil 121 therefore improves.

Also, the axial displacement may help to cause some turbulence in the cooling fluid when the cooling fluid reaches the corresponding axial end portion of the coil. Cooling may be improved in this manner too. Also, stiffness of the coils may be improved, thereby making the coils more resistant to bending under electromagnetic loads.

A cooling fluid may be air in some examples. The cooling fluid may flow between the coils 115 in an axial direction 142 in some examples, see e.g. FIG. 3. Particularly, the axial end portion that is further removed from the inlet of the cooling air may benefit from the above-described arrangement of strands improving the cooling.

In the example of FIG. 3, the electrical machine 100 is a radial electrical machine, in particular a generator 42. The generator may be a generator for a wind turbine 10, and more in particular for a direct drive wind turbine. The stator 120 comprises a plurality of coils 121 and the rotor 110 comprises a plurality of permanent magnet modules 111, but in other examples the coils 121 may be provided in the rotor 110 only, or coils 121 may be provided both in the rotor 110 and in the stator 121.

The generator 100 further comprises an air gap 116 separating the active rotor elements 111, in this example permanent magnet modules, and the active stator elements 121, in this example, coils. The air gap 116 may be a radial air gap.

Active elements may be regarded as elements of the rotor and/or the stator that are magnetically and/or electrically active. An active element may for example be a permanent magnet, a permanent magnet module, a single coil or pole shoe or a pole shoe including more than one coil. As illustrated in the example of FIG. 3, the active elements 111, 121 are connected, e.g. attached directly or through other elements, to a corresponding rotor rim or a stator rim.

A permanent magnet module 111 may be defined as a unit having a plurality of permanent magnets such that the plurality of magnets can be mounted and unmounted together. Such a module may have a module base with a shape suitable for housing or receiving a plurality of permanent magnets. The magnets may be fixed to the base in different manners. The base may be configured to be fixed to a field rim, e.g. to a rotor rim, in such a way that the plurality of magnets are fixed together to the field rim through the module base. The use of permanent magnet modules may facilitate the manufacturing of a generator field.

In the example of FIG. 3, the rotor 110 surrounds the stator 120, but in other examples the stator 120 may surround the rotor 110. Similarly, other configurations and other types of electrical machines 100 may be used. For example, the electrical machine 100 may be an axial machine, e.g. an axial generator. The electrical machine 100 may in some other examples be a motor.

The first axial end portion 123 may be further away from an inlet of the electrical machine 100 configured to receive a cooling fluid for cooling the coils 121 than the second axial end portion 125. The electrical machine 100 may comprise an inlet for receiving the cooling fluid and an outlet for removing the heated cooling fluid after contact with the coils. Therefore, having an axial displacement 117 in the axial end portion which is closer to the outlet may help to increase the cooling of the coils 121 and improve the operation of the electrical machine 100.

In this regard, a cooling system may be provided for cooling at least the coils 121 of the electrical machine 100. Such a cooling system may comprise a primary or "main" path or loop. A main loop may include a fluid inlet for a cooling fluid. A cooling fluid may be carried from the fluid inlet of the electrical machine to the coils. In some examples, air may be directed to the air gap 116 between the stator coils 121 and the permanent magnets 111. During operation, the coils heat up, and the cooling fluid (which may be air) is heated up too. The heated cooling fluid may then be carried away to a fluid outlet of the electrical machine.

In examples, the fluid outlet and inlet may fluidly communicate with an exterior of the machine. E.g. in the case of the wind turbine, the outlet and inlet may fluidly communicate with air surrounding the nacelle. For example, the cooling system may comprise fans, e.g. in the nacelle, for introducing air from an outside of the wind turbine through the fluid inlet for the cooling fluid. Conduits may carry the cooling fluid from the cooling fluid inlet to the generator air gap, and then conduits may carry the heated cooling fluid from the generator air gap to the fluid outlet. A part or all of the heated up cooling fluid may be exhausted to the outside.

In some examples, the fluid inlet and the fluid outlet may fluidly communicate with a heat exchanger where the temperature of the cooling fluid used for cooling the coils when flowing through the air gap is reduced. Conduits may be used to guide the heated cooling fluid inside the heat exchanger and then, once cooled down, out of it. The cooled cooling fluid may then be directed again towards the air gap between e.g. the permanent magnets of the rotor and the coils of the stator. The above-described systems may also be combined, e.g. a part of the cooling fluid is exhausted whereas another part is recirculated.

The first axial end portion 123 comprising the offset layers of strands may be an axial end portion of the coil 121 at which the coil is not electrically connected to other parts of the electrical circuit (e.g. to a busbar or another coil). In the examples of FIGS. 4A and 4B, the second axial end portion 125 is the axial end portion where the electrical connections 113 are arranged, whereas electrical connections are not arranged with the first axial end portion 123.

The first layer 130 and the second layer 131 may be adjacent layers. I.e., the first layer 130 may be axially displaced with respect to a second layer 131 adjacent to the first layer 130. These layers may be adjacent along a radial direction 144 of the electrical machine 100 (and therefore of the stator 120 and the rotor 110 too). In general, a coil 121 may comprise a plurality of stacked layers, see e.g. FIGS. 5A and 5B. Each layer may comprise a plurality of strands. The direction of stacking may define a height of the coil. When a coil is arranged in the electrical machine, for example when arranged around a stator tooth 119, the coil may have a height measured along the radial direction 144. In the examples of FIGS. 5A and 5B, a coil 121 comprises ten layers. In other examples, a coil may include a different number of layers.

In some examples, the first layer 130 is an outer layer of the coil 121 and the first axial end portion of the first layer 130 extends less in the axial direction than the first axial end portion of the second layer 131, see for example FIGS. 4A and 4B. The axial end portions of the layers at least partially overlap.

With this configuration, both the outer layer and the layer adjacent to it may be exposed to the cooling fluid, e.g. air, while not too much material (and thus weight) is added to the electrical machine. Therefore, a top and/or bottom layer of the coil 121, i.e. an outer layer of the coil, extending less than an adjacent layer in the axial direction may enhance cooling at an axial end portion of the coil 121.

Depending on how much a layer 131 is axially displaced 117 with respect to an adjacent layer 130, the axial ends of the layers 130, 131 may no longer touch or be overlapping. If the axial ends of the layers no longer touch, then a gap 118 in the axial direction arises. For example, the electrical machine may comprise an axial gap 118 between the first axial end portion of the first layer 130 of the coil and the first axial end portion of the second layer 130 of the coil. An axial gap 118 may herein be understood as a distance between the most distal part of the axial end portion of one layer and the most distal part of the axial end portion of another layer (the axial end portions being at a same axial side of the coil).

An axial gap 118 further increases the amount of surface of an axial end portion of a coil exposed to the cooling fluid, and therefore providing one or more axial gaps may allow to further improve the cooling of an axial end of a coil. Also, an axial gap 118 in combination with other features such as one or more cooling fluid guiding structures 149 (see e.g. FIGS. 10A and 10B) may enable to leverage an increase in the speed of the cooling fluid and thus may provide better cooling of the surface of the axial end portion of the coil exposed to the cooling fluid.

In the example of FIG. 5A, the first axial end portions of the first layer 130 and the second layer 131 are axially displaced, but the ends of the layers still touch or at least overlap in a radial direction 144. An axial gap is therefore not provided. In the example of FIG. 5B, the first axial end portions of the first layer and the second layer are axially displaced, and additionally an axial gap 118 is provided.

An axial displacement may in some examples be measured between an outer edge of an axial end of a layer and an outer edge of an axial end of the adjacent layer, as schematically illustrated in FIGS. 5A and 5B. Likewise, an axial gap 118 may in some examples be measured between an outer edge of an axial end of a layer (the outer edge of the layer which extends less in the axial direction from a centerline of a coil 109, see FIG. 4A) and an inner edge of an axial end of the adjacent layer (the inner edge of the layer which extends more in the axial direction from the centerline of the coil 109), see FIG. 5B. The centerline 109 may be parallel to the radial direction 144 of the electrical machine when the coil 121 is mounted in the machine.

An axial position of the axial end portions of the layers in the first axial end portion of the coil may change along a height of the coil in any suitable manner. For example, it may vary in an alternating manner from the top layer to the bottom layer or from the bottom layer to the top layer, e.g. along a radial direction of the electrical machine 144. In some of these examples, the first axial end portions of the layers of the coil 121 may be axially displaced in an alternating manner, in particular along a height of the coil, i.e. along the radial direction of the electrical machine. The cooling of the first end portion 123 of the coil 121 may be enhanced, as all the layers are axially displaced with respect to the adjacent layers and the contact with the cooling fluid is improved. The axial end portions of the layers of the first axial end portion 123 of the coil 121 may thus form a wave-like or triangular-like shape along a height of the coil. For example, the first end portions of the odd layers of a coil (e.g. layers number 1, 3, 5, etc. starting from the top or the bottom layer) may extend more in the axial direction 142 that the first end portions of the even layers of the coil (e.g. layers number 2, 4, 6, etc.). In other examples, the first end portions of the odd layers of a coil may extend less in the axial direction than the first end portions of the even layers of the coil.

The even layers may extend axially a same amount. I.e., all the even layers may have a same half-length (measured from centerline 109). In these or other examples, the odd layers may extend axially a same amount. I.e., all the odd layers may have a same half-length. An example where both the even layers and the odd layers extend a same amount is illustrated in FIGS. 5A and 5B. If the top layer 130 is layer number 1, the odd layers extend less than the even layers in the axial direction.

In some other examples, the coil 121 may comprise groups of layers, e.g. the layers of the coil may be grouped in pairs, trios, etc., and the first axial end portions of the groups may be axially displaced in an alternating manner between the groups. An example of this configuration is schematically illustrated in FIG. 6. In the example of this figure, the layers of the coil are grouped in pairs. The groups of layers may have a different number of layers in some other examples. For example, the coil may have layers grouped in pairs and grouped in trios.

The axial position of axial end portions of the layers in the first axial end portion of the coil may increase and then decrease along a direction parallel to a height of the coil, e.g. along a radial direction of the electrical machine 144. For example, a half-length of the layers comprising the first end portion may increase from a top or bottom layer of the coil along a radial direction up to a central region and then decrease from the central region to the bottom or top layer of the coil. Similarly to the previous explanations, the axial position of the axial end portions of the layers, or the half-length of the layers comprising the first end portion of the coil, may vary between adjacent layers in some examples and between groups of layers in some other examples.

Such variation of the position of the layer end portions may particularly be helpful for effectively, for example more homogeneously, cooling along a direction parallel to a height of the coil. As the cooling fluid cools the axial end portions of the coil from the outside, the most inner layers of the coil may be cooled less. By having the central layers of one or both of the axial end portions of the coil protruding more in the axial direction 142, these central regions may be cooled more effectively. The risk of damage to the coil may be reduced in this manner.

FIG. 7 schematically illustrates an enlarged view of another example of a central longitudinal cross-section of a coil. In this example, the axial position of the axial end portions of the layers increases from the top of the coil to a central region of the coil and then decreases to the bottom of the coil. The layers form groups, and the axial position of the axial end portions of the layers varies between the groups of layers.

It should be noted that although only a few particularly advantageous variations of the axial displacement of the end portions of the layers have been referred to herein, a half-length of the layers and an axial air gap 118 may in general vary in any suitable manner along a direction parallel to a height of a coil 121.

If an axial gap 118 is provided in an axial end portion of the coil 121, one or more supporting inserts may be provided for stabilizing the axial end portion of the coil. Therefore, the electrical machine 100 may further comprise a support insert arranged in an axial gap 118 and bridging the axial gap 118 at least partially, for example totally. A support insert may comprise a central body and two or more arms extending in opposite directions in some examples. The shape and size of the support insert may be varied and adjusted for example depending on how the axial displacement of the end portions of the layers varies along a height of the coil.

An example of a support insert 145 may be seen in FIGS. 8A-8C and 9. In FIG. 8A, the support insert 145 is being arranged in the first end portion of the coil 123, in particular at the axial end of the coil. In FIG. 8B, the support insert 145 has been installed in the first end portion of the coil. The support insert 145 has been rotated between FIGS. 8A and 8B. The arms of the support insert 145 extend along the axial direction in FIG. 8B. The arms fill a space between adjacent layers. The installed support insert 145 may also be seen in FIG. 9.

In some examples, the support insert 145 may be directly or indirectly connected to an axial protrusion 147 of a corresponding tooth 119 of a coil 121. The end portion of the coil comprising the support insert 145 may be tied, e.g. with suitable rope or tape 146, e.g. pre-peg tape, to the axial protrusion 147. In some examples, the tape 146 may surround the end portion of the coil and the axial protrusion 147 connected to the corresponding tooth 119, see FIGS. 8C and 9.

The axial protrusion 147 may be positioned between the tooth 119 and the end portion of the coil 123. The axial protrusion 147 may comprise a through-hole, e.g. extending in a radial direction, for passing the tape 146. The axial protrusion 147 may be non-magnetic. The axial protrusion 147 may be attached to an axial portion of the tooth 119. Tying the end portion of the coil 121 to the axial protrusion 147, e.g. in an axial direction, may help to ensure that the end portion of the coil is suitably positioned with respect to the tooth 119.

The electrical machine 100 may further comprise one or more guiding structures for directing the cooling fluid towards an axial end portion of the coil. The guiding structures, e.g. scoops, may be arranged in an axial region of the electrical machine which is closer to an outlet for removing the cooling fluid than to an inlet for introducing the cooling fluid in the electrical machine. For example, if the cooling fluid is to flow axially between the coils, the guiding structures may be positioned in an axial region close to the outgoing axial end portions of the coils.

In some examples, the coil 121 may comprise one or more cooling fluid guiding structures. For example, two guiding structures such as scoops 149 may be arranged with the first axial end portion 123 of the coil 121 and/or two guiding structures 149 may be arranged with the second axial end portion 125 of the coil 121, see FIG. 10A. The guiding structures may be attached, e.g. glued, to the end portions of the layers which protrude more axially outwards. The guiding structures, e.g. scoops, may be curved for adapting to a curvature of the axial end portion of the coil. A guiding structure 149 may for example have a shape similar to an integral symbol. ∫. The use of one or more guiding structures may help to direct the cooling fluid e.g. such that the cooling fluid increases a contact with the end portion of the coil 121, see the arrows in FIG. 10A. A guiding structure may be non-metallic.

In other examples, one or more guiding structures 149 may be provided in an inner wall, e.g. an axial wall, of the electrical machine 100 facing an axial end portion 123, 125 of the coil 121. For example, one or more scoops 149 may be arranged in a stator wall facing the first (or second) axial end portion of the coil 121, see FIG. 10B. Any suitable guiding structure may be used. For example, at least in the case where a scoop is arranged in an inner wall of the electrical machine, the scoop may be static or dynamic, e.g. a rotating scoop.

In some examples, in addition or as an alternative to one or more guiding structures in an inner wall such as scoops, one or more fans may be provided. The fans may be positioned for blowing air towards e.g. the first axial end portions of the coils.

The features of this aspect have been mainly explained with one, e.g. the first, axial end portion of the coil 121. It should be understood that the features and explanations also apply to the other axial end portion of the coil. I.e., the description and explanations with respect to FIGS. 3-9 apply to both axial end portions 123, 125 of the coil. In this regard, the first axial end portion of the coil 123 may comprise an axial displacement 117 between layers 130, 131, or the second axial end portion of the coil 125 may comprise an axial displacement 117 between layers 130, 131, or both the first and second axial end portions may comprise layers which are axially displaced.

For example, a second axial end portion of the first layer 130 of the coil 121 is axially displaced with respect to a second axial end portion of the second layer 131 of the coil 121, see e.g. FIGS. 4A and 4B. If the two axial end portions of the coil 121 comprise axially displaced layers, the displacement in the first axial end portion 123 and in the second axial end portion 125 may be equal, e.g. symmetric. In other examples, the first and second axial end portions of the coil may vary.

In a further aspect of the disclosure, a wind turbine 10 is provided. The wind turbine comprises the electrical machine 100 of the previous aspect. The electrical machine 100 may be a generator 42. The wind turbine may be an onshore wind turbine or an offshore wind turbine, e.g. a direct drive wind turbine. In some examples, the generator 42 may comprise a rotor and a stator, the stator including the coils 121. The rotor may for example comprise permanent magnets.

In a further aspect of the disclosure, a method 200 for insulating a coil is provided. A flowchart of the method is shown in FIG. 11. The method comprises, at block 210, bending electrically conductive strand and forming layers of a coil such that a first axial end portion of a first layer 130 of the coil is displaced along a longitudinal direction of the coil with respect to a first axial end portion of a second layer 131 of the coil. The method further comprises, at block 220, electrically insulating the first axial end portions of the first layer 130 and the second layer 131.

Electrically insulating may be performed in several ways. In some examples, electrically insulating 220 may comprise attaching a pre-shaped insulation element to the first axial end portion of the first layer 130 and to the first axial end portion of the second layer 131. This may be performed after the coil has been shaped or while the coil is being shaped. For example, after forming the first layer 130 and before forming the second layer 131, a pre-shaped insulation element may be attached, e.g. glued, to the first axial end portion of the first layer 130. And after forming the second layer 131, another pre-shaped insulation element may be attached, e.g. glued, to the first axial end portion of the second layer 131. Examples of pre-shaped insulation elements 148 are illustrated in FIGS. 12A and 12B. In some examples, a pre-shaped insulation element 148 may be clipped to an axial end portion of a layer.

Once the pre-shaped insulation elements 148 have been attached to the corresponding axial end portions of the coil, the end portion of the coil, or even the entire coil, may be infused, dipped, brushed or sprayed. For example, vacuum pressure impregnation (VPI) may be used. Other infusion methods, e.g. flood impregnation, dip impregnation or vacuum impregnation, may alternatively be used.

In some examples, the pre-shaped insulation elements 148 may be attached over electrical insulation already present. For example, if strand is surrounded with tape before the strand is bent for forming the different layers of the coil 121, pre-shaped insulation elements 148 may further be arranged on top of the already existing insulation.

If one or more cooling fluid guiding structures, e.g. scoops, are to be attached to an axial end portion of the coil 121, the guiding structures may be attached to the pre-shaped insulation elements. For example, the pre-shaped insulation element 148 of FIG. 12A may be provided with a scoop, e.g. two scoops, either before or after attaching the pre-shaped insulation element to the axial end portion of the corresponding layer of the coil.

In some other examples, electrically insulating 220 may comprise surrounding the electrically conductive strand with tape before bending the electrically conductive strand. In particular, the electrically conductive strand may be surrounded with tape such that, after bending the strand, the insulation in the first axial end portion of the first layer 130 and the second layer 131 is thicker than in the central portion of the first layer 130 and the second layer 131. For example, as a central portion of the coil may be wrapped in further electrical insulation once the coil has been formed, e.g. for increasing coil protection, providing a thicker insulation in the axial end portions of the layers while the coil is being formed may help to better protect the axial end portions of the coil when having end portions of the coil axially displaced.

The requirements of electric insulation may be different for the end portions of the axially displaced layers than for the central portion of the layers. Therefore, the electrically conductive strand(s) may be surrounded with more tape in the portions which will be an axial end portion after bending the strand(s). An example of obtaining a thicker insulation for these portions is illustrated in the example of FIG. 13.

In this example, electrically conductive strand 150, specifically three strands of strand such as copper strand, are surrounded with tape 151 before the strand is bent. The regions of the strand 150 which will be an axial end portion of the coil 121 are surrounded with more tape 151. This may be achieved in different manners. For example, the speed of feeding the tape 151 may be reduced for taping the regions which will be the axial end portions of the layers of the coil (or the speed of feeding the tape may be increased for taping the regions which will be the central portions of the layers of the coil). As an alternative, or in addition to it, the speed of feeding the strand 150 may be reduced for taping the regions which will be the axial end portions of the layers of the coil (or the speed of feeding the strand 150 may be increased for taping the regions which will be the central portions of the layers of the coil).

The speeding for feeding the tape 151 and or the strand 150 may be adjusted depending on the final shape and size desired for each layer of the coil 121. The axial end portion(s), or even the entire coil may further be impregnated or dipped e.g. using VPI.

According to a further aspect of the disclosure, a generator 42 for a wind turbine 10, optionally a direct-drive wind turbine, is provided. The generator comprises a rotor, a stator and a radial air gap separating the rotor and the stator. The stator comprises a plurality of teeth 119 and a plurality of coils 121 wound around the teeth 119 in layers. A coil 121 comprises a first layer 130 having an axial end portion axially displaced with respect to an axial end portion of a second layer 131 adjacent the first layer 130. The axial end portions of the first layer 130 and the second layer 131 are at a same axial region 123 of the coil 121.

There may be an axial gap 118 separating the axial end portion of the first layer 130 and the axial end portion of the second layer 131.

The generator may further comprise an insert 145 bridging the axial gap for stabilizing the end portion of the coil 121. Vibrations of the end portion may be avoided or at least reduced.

The generator may further comprise one or more guiding structures, e.g. scoops, attached to the axial end portion of the second layer for increasing a contact between a cooling fluid and the axial end portion. The axial end portion of the second layer may protrude more than the first layer in the axial direction.

An electrical insulation 151 of the axial end portion of the first 130 and second 131 layers may be thicker than an electrical insulation of a middle portion of the first 130 and second 131 layers.

The end portions of the layers at a same axial region or end portion of the coil 121 may protrude axially in an alternating manner.

An extension of the end portions of the layers at a same axial region of the coil may increase from a top layer to a middle layer and then decrease to a bottom layer.

The features and explanations of the previous aspects, e.g. with respect to FIGS. 1-13, may also apply to, and combined with, this aspect, and vice versa.

For reasons of completeness, various aspects of the present disclosure are set out in the following numbered clauses:

Clause 1. An electrical machine (100) comprising:

a rotor (110); and a stator (120);

wherein at least one of the rotor (110) and the stator (120) comprises a plurality of teeth (119) and a plurality of coils (121), the coils (121) comprising one or more strands (150) wound around the teeth (119) in layers (130, 131);

the coils (121) comprising a first axial end portion (123), a central portion (124) and a second axial end portion (125) opposite to the first axial end portion (123); and the layers (130, 131) of the coils (121) comprising a first axial end portion, a central portion and a second axial end portion opposite to the first axial end portion;

wherein a first axial end portion of a first layer (130) of at least one of the coils (121) is axially displaced (117) with respect to a first axial end portion of a second layer (131) of the coil (121).

Clause 2. The electrical machine of clause 1, wherein the first axial end portion (123) of the coil (121) is further away from an inlet of the electrical machine (100) configured to receive a cooling fluid for cooling the coils (121) than the second axial end portion (125) of the coil (121).

Clause 3. The electrical machine of clause 1 or clause 2, wherein the first layer (130) and the second layer (131) are adjacent layers.

Clause 4. The electrical machine of clause 3, wherein the first layer (130) is an outer layer of the coil (121), and the first axial end portion of the first layer (130) extends less in the axial direction (142) than the first axial end portion of the second layer (131).

Clause 5. The electrical machine of clause 3 or 4, further comprising an axial gap (118) between the first axial end portion of the first layer (130) of the coil (121) and the first axial end portion of the second layer (131) of the coil (121).

Clause 6. The electrical machine of clause 5, further comprising a support insert (145) arranged in the axial gap (118) and bridging the axial gap (118) at least partially.

Clause 7. The electrical machine of clause 6, wherein the support insert (145) is directly or indirectly connected to an axial protrusion (147) of a corresponding tooth (119) of the coil (121).

Clause 8. The electrical machine of clause 7, wherein the first axial end portion (123) of the coil (121) comprising the support insert (145) is tied (146) to the axial protrusion (147).

Clause 9. The electrical machine of any of clauses 1-8, wherein an axial position of axial end portions of the layers (130, 131) in the first axial end portion (123) of the coil (121) varies in an alternating manner from a top layer to a bottom layer.

Clause 10. The electrical machine of any of clauses 1-8, wherein an axial position of axial end portions of the layers (130, 131) in the first axial end portion (123) of the coil (121) increases from a top layer to a central region and then decreases from the central region to a bottom layer.

Clause 11. The electrical machine of any of clauses 1-10, further comprising one or more guiding structures (149) for directing a cooling fluid towards the first end portion (123) of the coil (121).

Clause 12. A method (200) for insulating a coil (121) comprising:

bending (210) electrically conductive strand (150) and forming layers (130, 131) of a coil (121) such that a first axial end portion of a first layer (130) of the coil (121) is displaced (117) along a longitudinal direction of the coil (121) with respect to a first axial end portion of a second layer (131) of the coil (121); and electrically insulating (220) the first axial end portions of the first layer (130) and the second layer (131).

Clause 13. The method of clause 12, wherein electrically insulating (220) comprises attaching a pre-shaped insulation element (148) to the first axial end portion of the first layer (130) and to the first axial end portion of the second layer (130).

Clause 14. The method of clause 12, wherein electrically insulating (220) comprises surrounding the electrically conductive strand (150) with tape (151) before bending the electrically conductive strand (150).

Clause 15. The method of clause 14, wherein the electrically conductive strand (150) is surrounded with tape (151) such that, after bending the strand, the electrical insulation in the first axial end portion of the first layer (130) and the second layer (131) is thicker than in the central portion of the first layer (130) and the second layer (131).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine comprising:

a rotor;

a stator;

wherein at least one of the rotor and the stator comprises a plurality of teeth and a plurality of coils, the plurality of coils comprising:

one or more strands wound around the teeth in a plurality of layers comprising at least a top layer, a bottom layer, and an intermediate layer disposed between the top layer and the bottom layer, each of the plurality of layers comprising a first axial end portion, a central portion and a second axial end portion opposite to the first axial end portion;

wherein the first axial end portion of the top layer of at least one of the coils is axially displaced with respect to the first axial end portion of the intermediate layer of the at least one of the coils, wherein respective axial positions of the first axial end portions of the plurality of layers of the at least one coil vary in an alternating manner from the top layer to the bottom layer, and one or more guiding structures for directing a cooling fluid towards the first axial end portions of the plurality of layers, wherein the one or more guiding structures are arranged in an axial region of the electric machine that is closer to an outlet for removing cooling fluid from the electric machine than to an inlet for introducing the cooling fluid to the electric machine.

2. The electrical machine of claim 1, wherein the first axial end portion of each of the layers is further away from an inlet of the electrical machine configured to receive a cooling fluid for cooling the coils than the second axial end portion of each of the layers.

3. The electrical machine of claim 1, wherein the intermediate layer and at least one of the top layer and the bottom layer are adjacent layers.

4. The electrical machine of claim 3, wherein the first axial end portion of the at least one of the top layer and the bottom layer extends less in the axial direction than the first axial end portion of the intermediate layer.

5. The electrical machine of claim 3, further comprising an axial gap between the first axial end portion of the at least one of the top layer and the bottom layer of the at least one of the coils and the first axial end portion of the intermediate layer of the at least one of the coils.

6. The electrical machine of claim 5, further comprising a support insert arranged in the axial gap and bridging the axial gap at least partially.

7. The electrical machine of claim 6, wherein the support insert is directly or indirectly connected to an axial protrusion of a corresponding tooth.

8. The electrical machine of claim 7, wherein the first axial end portion of at least one of the layers is tied to the axial protrusion.

9. A method for insulating a coil comprising:

bending electrically conductive strand and forming a plurality of layers of a coil such that a first axial end portion of an intermediate layer of the coil is displaced along an axial direction of the coil with respect to at least one of a first axial end portion of a top layer of the coil and a first axial end portion of a bottom layer of the coil;

electrically insulating the first axial end portions of the top layer, the intermediate layer, and the bottom layer, and providing one or more guiding structures for directing a cooling fluid towards the first axial end portions of the plurality of layers, wherein the one or more guiding structures are arranged in an axial region that is closer to an outlet for removing cooling fluid from the coil than to an inlet for introducing the cooling fluid to the coil;

wherein respective axial positions of the first axial end portions of the plurality of layers vary in an alternating manner from the top layer to the bottom layer.

10. The method of claim 9, wherein electrically insulating comprises attaching a pre-shaped insulation element to the first axial end portion of the first layer and to the first axial end portion of the second layer.

11. The method of claim 9, wherein electrically insulating comprises surrounding the electrically conductive strand with tape before bending the electrically conductive strand.

12. The method of claim 11, wherein the electrically conductive strand is surrounded with tape such that, after bending the strand, the electrical insulation in the first axial end portion of the first layer and the second layer is thicker than in the central portion of the first layer and the second layer.

13. A generator for a wind turbine comprising:

a rotor;

a stator; and a radial air gap separating the rotor and the stator;

the stator comprising a plurality of teeth and a plurality of coils wound around the teeth in a plurality of layers comprising at least a first layer and a second layer adjacent to each other, wherein an axial end portion of the first layer is axially displaced with respect to an axial end portion of the second layer, the axial end portions of the first layer and the second layer being adjacent to each other; and one or more guiding structures configured to directing a cooling fluid towards the axial end portions of the first and second layers, the one or more guiding structures being disposed at least partially axially outward of the plurality of coils.

14. The generator of claim 13, wherein the one or more guiding structures are attached to the axial end portion of the second layer for increasing a contact between a cooling fluid and the axial end portions of the first and second layers.

15. The generator of claim 13, wherein an electrical insulation of the axial end portion of the first and second layers is thicker than an electrical insulation of a middle portion of the first and second layers.

16. The generator of claim 13, wherein the one or more guiding structures has a scoop shape.

17. The generator of claim 13, wherein there is an axial gap separating the axial end portion of the first layer and the axial end portion of the second layer.

18. The generator of claim 17, further comprising an insert bridging the axial gap.

* * * * *